United States Patent Office 2,916,792
Patented Dec. 15, 1959

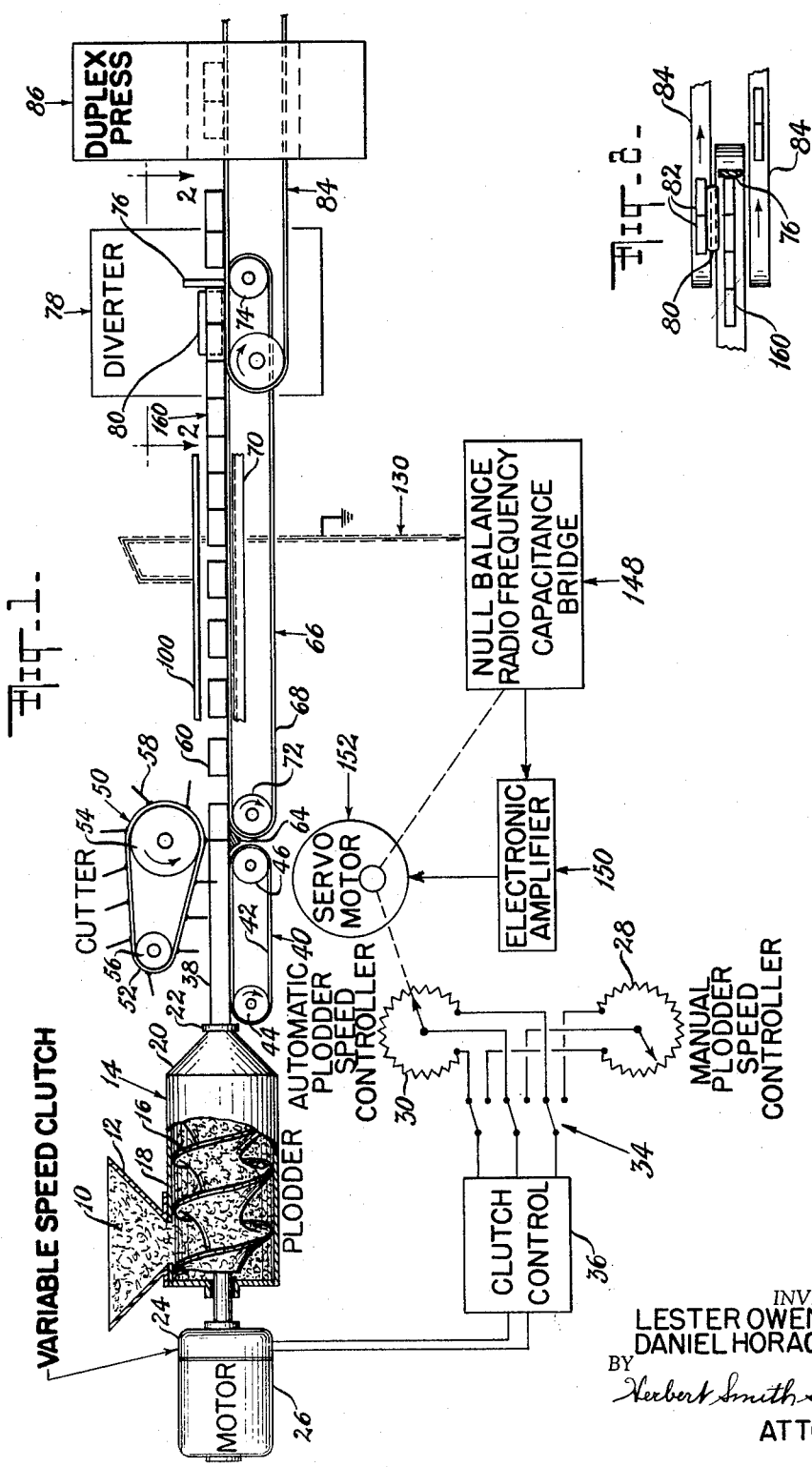

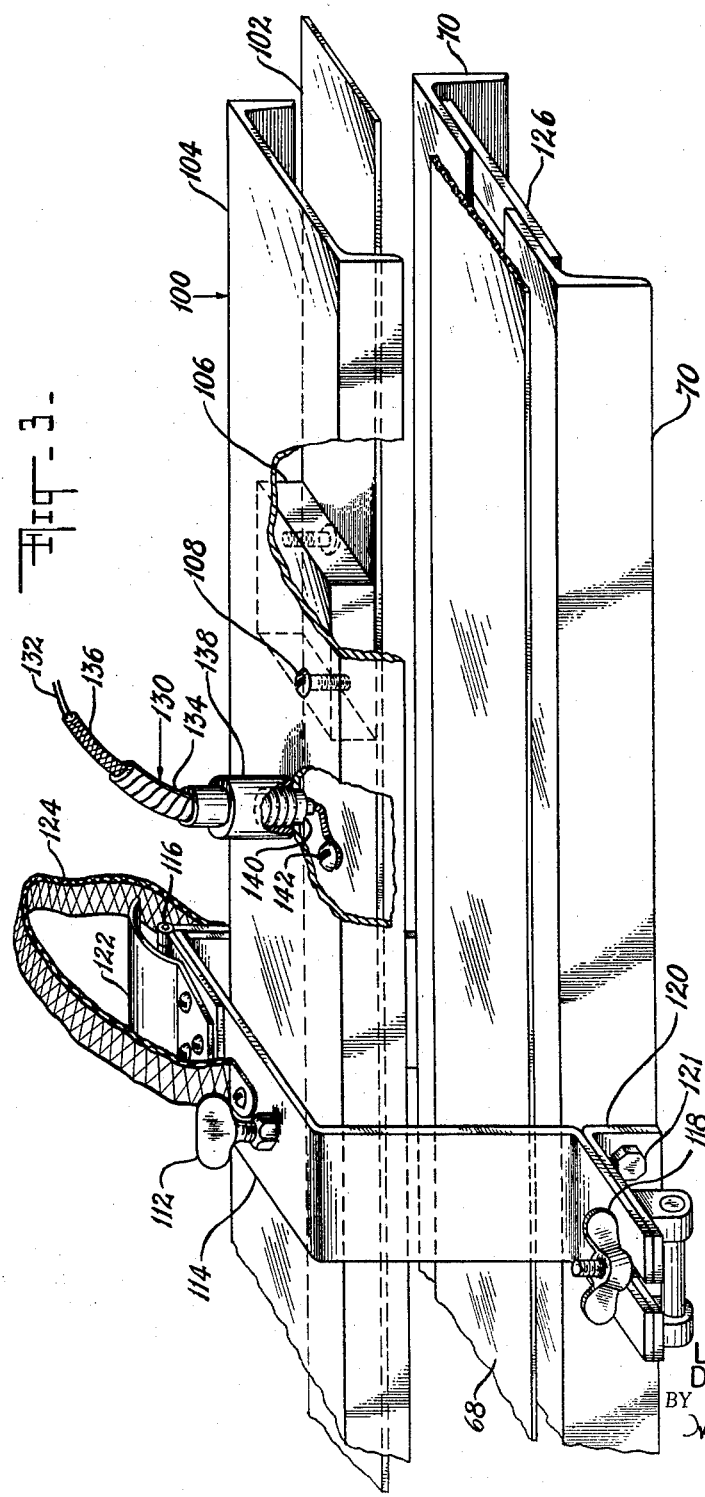

2,916,792

APPARATUS FOR AND METHOD OF CONTROLLING THE RATE OF EXTRUSION OF A PLASTIC MATERIAL OF VARYING WORKABILITY

Lester Owen Crook, El Cerrito, and Daniel Horace Kincaid, Walnut Creek, Calif., assignors to Colgate-Palmolive Company, New York, N.Y., a corporation of Delaware Application September 24, 1957, Serial No. 685,887

9 Claims. (Cl. 25—8)

The present invention relates to apparatus for and a method of controlling the rate of extrusion of a plastic material of varying workability. More particularly the present invention relates to apparatus for and a method of controlling the rate of extrusion of a plastic detergent.

Detergent cakes (e.g. soap or synthetic detergent cakes) are frequently prepared by a procedure which involves plodding or expressing of the detergent while in a plastic condition by a helical screw through a die to form a continuous bar. The extruded continuous bar is cut to form short blanks, which are then stamped in a press to form the final detergent cakes.

For efficient operation of such a system it is desirable that the rate at which the continuous bar is extruded and cut be harmonized or synchronized with the demand of the press, which is easily fixed at a constant rate. However, this is difficult because the workability of the detergent supplied to the plodder is not constant, varying with the moisture content, solids composition, and temperature of the detergent. Thus even though the helical screw of the plodder is rotated at constant speed, the rate of extrusion by the plodder of the continuous bar fluctuates with changes in the workability of the detergent, and at the speed of operation commonly employed in modern plodders, e.g. production of continuous bars at speeds of from 40 to 50 feet per minute and higher, small fluctuations in workability are sufficient to change deleteriously the output rate of a plodder which is feeding a constant rate press.

In accordance with the present invention, apparatus for controlling the rate of extrusion of a plastic material of varying workability comprises means for extruding a plastic material in worked form, means for controlling the speed of said extrusion means, means adapted to form said extruded material into discrete sub-units thereof, a conveyor for said sub-units adapted to transport said sub-units in spaced relationship, means for retarding the travel of said discrete sub-units with respect to said conveyor to cause said sub-units to accumulate in contiguous relationship as a backlog, means for removing sub-units from said backlog, electric means for detecting the extent of said backlog, and means interconnecting said detecting means with said speed controlling means to maintain the extent of said backlog within predetermined limits. Also within the scope of the present invention is a process for controlling the rate of extrusion of a plastic material of varying workability which comprises extruding said plastic material, forming said extruded material into discrete sub-units thereof, transporting said sub-units in spaced relationship, retarding the travel of said sub-units to cause accumulation thereof in contiguous relationship as a backlog thereof, removing sub-units from said backlog, electrically detecting the extent of said backlog, and varying the rate of said extrusion of said plastic material in accordance with said detected extent so as to maintain the extent of said backlog within predetermined limits.

A preferred specific embodiment of this invention is shown in the accompanying drawings in which:

Fig. 1 illustrates a soap finishing line adapted to process soap chips into blanks which pass between the electrodes of a capacitor on their way to a diverter which supplies a duplex press with blanks for stamping into final form, Fig. 2 is a plan view of the diverter taken along the line 2—2 of Fig. 1, and Fig. 3 is a fragmentary perspective view showing the electrodes of Fig. 1.

According to the drawings, soap chips 10 are fed from a hopper 12 to a plodder 14 having a helical screw or worm 16, a barrel 18, a nozzle 20, and a die 22. The worm is coupled through an eddy-current type variable speed electric clutch 24 to a constant speed electric motor 26. The speed of the plodder is varied by either a manually operated slide wire plodder speed controller 28 or by an automatic plodder speed controller 30, either of which may be selected by means of a controller selector switch 34. These slide wires control the speed of the plodder by varying the current supplied to the electric clutch 24 by an electronic clutch control unit 36.

The plodder compresses the soap chips and extrudes a continuous bar of soap 38. At a fixed setting of the plodder speed controller slide wire being used, the rate at which the continuous bar is extruded by the plodder is determined by the workability of the soap supplied thereto, which, as set forth hereinabove, varies with its moisture content, solids composition, and temperature. As soap manufacture is normally a batch-wise process, it is not feasible to supply material of unvarying workability to the plodder.

The continuous bar of soap 38 is expressed through the plodder nozzle 22 on to an initial conveyor 40 comprising a flexible belt 42, a driven pulley 44 and an idler pulley 46. A cutter 50, comprising a flexible belt 52 riding on a driven pulley 54 and an idler pulley 56 and having knives 58 mounted on the belt, engages the continuous soap bar 38 and cuts it into blanks 60. A torque, not quite sufficient to overcome the static friction of the cutter, is applied to the driven pulley 54 of the cutter through a clutch (not shown), resulting in the cutter blades and belt being moved by and at the same speed as the continuous bar of soap.

The soap blanks leaving the cutter pass over a rest 64 and on to a high speed conveyor 66 having a belt 68 which is supported by bed rails 70. The high speed conveyor belt also passes over a driven wheel 72 and an idler wheel 74. The soap blanks are carried by the high speed conveyor up to a stop 76 in a diverter 78.

At the diverter a swinging bar 80 displaces two blanks 82 alternately on to one of two belt conveyors 84 feeding a duplex press 86 which stamps the blanks to the final cake form.

Suspended a slight distance above the top of the soap blanks on the high speed conveyor is a shielded upper electrode assembly 100, which together with the bed rails 70 of the high speed conveyor which are employed as a second, grounded electrode, comprise a detecting capacitor.

As illustrated in detail in Fig. 3, the upper electrode assembly 100 of the detecting capacitor comprises a metal electrode strip 102 which is insulated from a grounded shield 104 by an insulating block 106 affixed to both members with nylon screws 108. The shield is supported at an adjustable height by thumb screws 112 depending from a hinged bracket 114 which has a hinge 116 at one corner. One end of the hinged bracket is removably affixed by wing nuts 118 to a lower bracket 120, which in turn is bolted to a bed rail by bolts 121 (the other end of the bracket being bolted to the other bed rail by bolts not shown). Access to the upper electrode or to the high speed conveyor belt 68 is easily obtained by removing the wing nut 118 and pivoting the hinged bracket 114 against a pivot stop 122. A ground strap 124 maintains electrical continuity through the hinged section of the hinged bracket 114. The conveyor bed rails are connected together mechanically and electrically by a metal strip 126 welded thereto.

Electrical connections to the electrodes are made by means of a coaxial cable 130 having a center conductor 132, a grounded outer conductor 134, and insulation 136 therebetween. The coaxial cable is terminated in a plug 138 which mates with a socket 140 mounted on the top of grounded shield 104, the outer grounded conductor 134 of the cable being connected to the grounded shield 104, and thus, through the hinged bracket 114 to the bed rails 70. The inner conductor of the coaxial cable is connected to a metal screw 142 and held in contact with the metal electrode strip 102 upper electrode assembly 100.

The coaxial cable 130 from the electrodes of the detecting capacitor is connected to a null balance radio frequency capacitance bridge 148 (see Fig. 1) which contains a source of modulated radio frequency voltage (500 kilocycles per second modulated at 60 cycles per second) and a demodulator. An electronic amplifier 150 and a servo motor 152 coact to maintain the balance of the bridge when the capacitance of the detector capacitor changes by adjusting a variable capacitor in an arm of the bridge. The rotor of the servo motor is also mechanically coupled to the automatic plodder speed controller 30. (A suitable commercially available unit comprising such a bridge, electronic amplifier and servo motor is the Series 42 Null Balance Radio Frequency Capacitance Bridge manufactured by the Fielden Instrument Division of the Robertshaw-Fulton Controls Company.)

In operation, the duplex press 86, the belt conveyors 84 feeding the press 86, and the diverter 78 are all operated at the same, constant soap processing rate. The plodder 14 is also operated at the same rate, or as close thereto as possible. As the high speed conveyor 66 operates at a speed approximately 50% to 150% higher than the plodder 14, the rate at which blanks are fed to the high speed conveyor is less than the lineal speed thereof and therefor the blanks are deposited thereon in a spaced relationship as shown in Fig. 1 immediately down stream of the driven pulley 72 of the high speed belt conveyor.

The blanks continue to ride the high speed belt in spaced relationship until arrested by the upstream end of a backlog 160 of previously accumulated contiguous blanks of soap supported by the diverter stop 76 and riding the high speed conveyor belt by slipping thereon. It is essential to the proper operation of the diverter and press to maintain a backlog of at least 2 and preferably 3 blanks against the soap diverter at all times as otherwise the press may not be adequately fed or the swinging bar of the diverter may shear off a portion of a blank.

In starting the unit, the controller selector switch 34 is thrown to the "manual" position and manual plodder speed controller 28 is adjusted to cause the backlog 160 of contiguous soap cakes to accumulate until it extends into the electric field between the electrodes 70 and 102 of the detecting capacitor. The automatic plodder speed controller 30 is turned to the same setting and the bridge 148 is balanced. The controller selector switch 34 is then thrown to the automatic position and thereafter the preestablished backlog is continuously maintained.

The operation of the present device is based on the fact that the interelectrode capacitance of the detecting capacitor varies with the dielectric therebetween, and that the dielectric constant of soap blanks is much greater than that of air. Thus a change in the ratio of air to soap between the electrodes 70 and 102 is reflected as a change in the capacitance of the detecting capacitor, which acts to unbalance the bridge 148. This unbalance, is compensated for by rotation of the servo motor 152 as referred to hereinbefore, which simultaneously corrects the speed of the plodder 14 by means of the automatic plodder speed controller 30. Thus the detector continuously senses any error from a pre-established norm and by an electromechanical linkage automatically corrects therefor.

While there has been disclosed and described that which at present is considered to be the preferred embodiment of the invention, it will be understood that changes, modifications and substitutions may be made therein without departing from the true scope of the invention as defined in the appended claims. Thus, although the present apparatus has been illustrated using one detecting electrode above and a second detecting electrode below detergent blanks, other electrode configurations may be employed as long as the plastic material being processed passes through the electric field of the detecting capacitor. For instance, a pair of side rails, insulated from contact with the blanks, may be placed adjacent to or on each side of a conveyor and used as the two detecting electrodes, or they may be connected electrically and used as a common electrode in conjunction with a second electrode such as the bed rails referred to herein. It is also apparent that plastic dielectric materials other than soap may be processed according to the present invention, e.g. non-soap synthetic detergent compositions and the like.

What is claimed is:

1. Apparatus for controlling the rate of extrusion of a plastic material of varying workability which comprises means for extruding a plastic material in worked form, means for controlling the speed of said extrusion means, means adapted to form said extruded material into discrete sub-units thereof, a conveyor for said sub-units adapted to transport said sub-units in spaced relationship, means for retarding the travel of said discrete sub-units with respect to said conveyor to cause said sub-units to accumulate in contiguous relationship as a backlog thereof, electric means for detecting the extent of said backlog, and means interconnecting said detecting means with said speed controlling means to maintain the extent of said backlog within predetermined limits.

2. Apparatus as set forth in claim 1 wherein (a) said means for extruding a plastic material in worked form is means for extruding a plastic detergent as a continuous bar, (b) said means adapted to form extruded material into discrete sub-units is a cutter adapted to cut said continuous bar into discrete blanks, and (c) said electric means is electronic means.

3. Apparatus for the continuous production of detergent blanks comprising a plodder adapted to extrude a continuous bar of detergent, means for controlling the speed of operation of said plodder, a cutter adapted to cut said continuous bar into discrete blanks, a conveyor adapted to transport said blanks in spaced relationship at a constant linear speed greater than the normal maximum speed of extrusion of said plodder, means for retarding the travel of said blanks with respect to said conveyor to cause said blanks to accumulate in contiguous relationship as a backlog, means for removing blanks from said backlog at a constant rate, capacitor means for detecting the extent of said backlog with respect to a pre-established norm, and electro-mechanical means interconnecting said detecting means with said plodder speed controlling means to maintain the extent of said backlog at substantially said pre-established norm.

4. Apparatus for the continuous production of detergent blanks as set forth in claim 3 wherein said capacitor means comprises spaced capacitor electrodes having an electric field therebetween encompassing said backlog.

5. Apparatus for the continuous production of soap blanks comprising a helical screw soap plodder adapted to extrude a continuous bar of soap at a rate proportional to the speed of rotation of said screw, means for controlling the speed of rotation of said plodder screw, a cutter adapted to cut said continuous bar into discrete blanks, spaced capacitor electrodes having a high frequency alternating electric voltage impressed thereon, a constant speed conveyor adapted to carry said discrete blanks in spaced relationship through the alternating electric field of said capacitor, means for retarding travel of said blanks with respect to said conveyor whereby said blanks accumulate thereon in contiguous relationship as a backlog extending into said electric field, means for removing blanks from said backlog at a constant rate, means for detecting changes in the capacitance between said electrodes from a predetermined value characteristic of a desired extent of said backlog, and electronic circuit means interconnecting said detecting means with said speed controlling means for said plodder screw to control the rate of production of said continuous bar so as to maintain said backlog at a substantially said predetermined value.

6. A process for controlling the rate of extrusion of a plastic material of varying workability which comprises extruding said plastic material, forming said extruded material into discrete sub-units thereof, transporting said sub-units in spaced relationship, retarding the travel of said sub-units to cause accumulation thereof in contiguous relationship as a backlog thereof, removing sub-units from said backlog, electrically detecting the extent of said backlog, and varying the rate of said extrusion of said plastic material in accordance with said detected extent so as to maintain the extent of said backlog within predetermined limits.

7. A process as set forth in claim 6 wherein (a) plastic detergent is expressed to form a continuous bar thereof which is thereafter cut into discrete blanks, and (b) the extent of said backlog is capacitively detected.

8. A process for controlling the rate of extrusion of a plastic detergent of varying workability which comprises applying sufficient force against a plastic detergent to extrude it into the form of continuous bar thereof, cutting said detergent bar into discrete blanks, transporting said blanks sequentially in spaced relationship, retarding the travel of said spaced blanks to cause accumulation thereof in contiguous relationship as a backlog, removing blanks from said backlog at a constant rate, capacitively continuously detecting the extent of said backlog with respect to a predetermined norm, and varying said force in accordance with said detected extent of said backlog so as to maintain said backlog substantially at said pre-established norm, whereby the rate at which said plastic detergent is extruded is maintained substantially equal to the rate at which blanks are removed from said backlog.

9. A process for controlling the rate of extrusion of a plastic detergent of varying workability by a variable speed plodder which comprises extruding such a detergent from such a plodder to form a continuous bar of said detergent, cutting said bar into discrete blanks, transporting said blanks sequentially in spaced relationship through the electric field of a capacitor, retarding the travel of said spaced blanks to cause accumulation thereof in contiguous relationship as a backlog, said backlog extending into said electric field, removing blanks from said backlog, detecting changes in the interelectrode capacitance of said capacitor caused by variations in the amount of soap within said electric field, and varying the speed of said plodder in accordance with said detected changes in capacitance.

References Cited in the file of this patent

UNITED STATES PATENTS

| | | |
|---|---|---|
| 2,296,842 | Garvey | Sept. 29, 1942 |
| 2,484,506 | Hawk | Oct. 11, 1949 |
| 2,688,459 | Merrill et al. | Sept. 7, 1954 |